(12) United States Patent
Seidl et al.

(10) Patent No.: US 10,156,294 B2
(45) Date of Patent: Dec. 18, 2018

(54) FLUIDIC SAFETY VALVE AND BATTERY COMPONENT EQUIPPED THEREWITH

(71) Applicant: Lisa Draexlmaier GmbH, Vilsbiburg (DE)

(72) Inventors: Stefan Seidl, Landshut (DE); Stefan Deser, Landshut (DE); Bernhard Wallner, Velden (DE); Daniel Heinecke, Ergoldsbach (DE)

(73) Assignee: Lisa Drawxlmaier GMBH, Vilsbiburg (DE)

( * ) Notice: Subject to any disclaimer, the term of this patent is extended or adjusted under 35 U.S.C. 154(b) by 256 days.

(21) Appl. No.: 15/146,829

(22) Filed: May 4, 2016

(65) Prior Publication Data
US 2016/0327171 A1 Nov. 10, 2016

(30) Foreign Application Priority Data
May 5, 2015 (DE) ........................ 10 2015 106 983

(51) Int. Cl.
*F16K 17/04* (2006.01)
*F16K 27/02* (2006.01)
(Continued)

(52) U.S. Cl.
CPC ............ *F16K 17/04* (2013.01); *F16K 15/025* (2013.01); *F16K 15/026* (2013.01);
(Continued)

(58) Field of Classification Search
CPC ...... F16K 17/04; F16K 15/025; F16K 15/026; F16K 17/0413; F16K 17/36;
(Continued)

(56) References Cited

U.S. PATENT DOCUMENTS

| | | | | |
|---|---|---|---|---|
| 1,057,288 A | * | 3/1913 | Short ................. | G05D 16/0655 137/505.41 |
| 3,289,686 A | * | 12/1966 | Tyer, Jr. ................ | F16K 17/003 137/529 |

(Continued)

FOREIGN PATENT DOCUMENTS

| DE | 1600804 A1 | 2/1970 |
|---|---|---|
| DE | 1596123 B1 | 2/1971 |

(Continued)

OTHER PUBLICATIONS

German Office Action regarding German Patent Application No. 10 2015 106 983.0 dated Mar. 5, 2015, Applicant: Lisa Draexlmaier GmbH.

(Continued)

*Primary Examiner* — Marina Tietjen
*Assistant Examiner* — Frederick D Soski
(74) *Attorney, Agent, or Firm* — Finnegan, Henderson, Farabow, Grrett & Dunner, LLP

(57) ABSTRACT

Embodiments disclose a fluidic safety valve comprising a valve housing including at least one fluid inlet opening and at least one fluid outlet opening. A closing element, guided in the valve housing, is preloaded by a spring element at a predetermined preloading force toward a closed position of the safety valve. In the closed position, a fluid flow from the at least one fluid inlet opening toward the at least one fluid outlet opening is blocked. When a predetermined fluid pressure is reached, the closing element moves toward an open position of the safety valve, enabling a fluid flow from the at least one fluid inlet opening toward the at least one fluid outlet opening. The valve housing is sealed by a valve housing sealing element comprising an effective fluid pressure force surface coupled to the closing element and (Continued)

configured to carry along the closing element relative to the housing.

18 Claims, 5 Drawing Sheets

(51) Int. Cl.
    *F16K 15/02*     (2006.01)
    *F16K 17/36*     (2006.01)
    *F16K 31/12*     (2006.01)
    *H01M 2/12*     (2006.01)

(52) U.S. Cl.
    CPC .......... *F16K 17/0413* (2013.01); *F16K 17/36* (2013.01); *F16K 27/0209* (2013.01); *F16K 31/12* (2013.01); *H01M 2/1229* (2013.01); *H01M 2/1276* (2013.01); *H01M 2220/20* (2013.01); *Y10T 137/7924* (2015.04)

(58) Field of Classification Search
    CPC .. F16K 27/0209; F16K 31/12; H01M 2/1229; H01M 2/1276; H01M 2220/20; Y10T 137/7924; Y10T 137/7931
    See application file for complete search history.

(56) References Cited

U.S. PATENT DOCUMENTS

| 3,336,934 | A | * | 8/1967 | Clements | G05D 16/0655 |
| | | | | | 137/115.15 |
| 3,436,273 | A | | 4/1969 | Gratzmuller | |
| 5,258,242 | A | * | 11/1993 | Dean | H01M 2/1276 |
| | | | | | 429/54 |
| 5,538,807 | A | * | 7/1996 | Hagiuda | H01M 2/1016 |
| | | | | | 429/100 |
| 5,637,422 | A | * | 6/1997 | Edamoto | H01M 2/1229 |
| | | | | | 429/202 |
| 9,428,304 | B2 | * | 8/2016 | Scagliarini | H01M 2/1205 |

FOREIGN PATENT DOCUMENTS

| DE | 10201222870 A1 | 6/2014 |
| FR | 1529839 A | 6/1968 |
| WO | WO 2013093179 A1 | 6/2013 |

OTHER PUBLICATIONS

English Translation of FR1529839 A.

* cited by examiner

FLUIDIC SAFETY VALVE AND BATTERY COMPONENT EQUIPPED THEREWITH

CROSS REFERENCE TO RELATED APPLICATION

This application is based upon and claims the benefit of prior German Patent Application No. 10 2015 106 983.0, filed on May 5, 2015, the entire contents of which are incorporated herein by reference.

TECHNICAL FIELD

The present disclosure relates to a fluidic safety valve for use in a battery component. The present disclosure further relates to a battery component, in particular a vehicle battery component, comprising the fluidic safety valve.

BACKGROUND OF THE DISCLOSURE

Fluidic safety valves known in the prior art include, for example, German Patent No. 1 596 123 B and German Patent No. 1 600 804 A. Further safety valves not explicitly intended for a battery component are known, for example, from French Patent No. 1 529 839 A or WO 2013/093179 A1.

German Patent No. 1 596 123 B describes a fluidic safety valve. German Patent No. 1 600 804 A describes another fluidic safety valve in which an internal cell pressure causes a deformation of an elastic membrane of a rarefied-air can, opening a valve by way of a mechanism and allowing undesirable overpressure to escape.

French Patent No. 1 529 839 A describes a safety valve comprising a membrane that on one side is exposed to a pressure of a fluid and preloaded in a closed position by way of a spring. When a predetermined pressure is exceeded, the membrane moves and connects an inlet port to an outlet port.

WO 2013/093179 A1 describes a safety valve for a fuel injection system. The valve comprises a piston guided in a cylinder, a spring, an inlet port, and a radial outlet port.

German Patent Application No. 10 2012 222 870 A1 discloses fluidic safety valves and pressure relief valves that protect pressurized chambers, pressure vessels, and fluid pressure chambers against an impermissible rise in pressure. This protection occurs, for example, when a safety valve discharges gases, vapors or liquids into the atmosphere in collecting pipes or the like when a predetermined fluid pressure is reached and/or exceeded.

Such safety valves may be used in vehicle technology. For example, German Patent Application No. 10 2012 222 870 A1 discloses that in electric or hybrid vehicles, batteries or secondary elements (such as rechargeable batteries), are used as electrical energy storage elements and/or traction batteries. A plurality of individual cells or blocks can be interconnected to form a battery system. Nickel metal hydride cells, lithium ion cells or the like may be used as battery components or battery systems.

It is generally necessary to provide a safety valve as a vent valve in such battery components or battery systems. Sudden chemical reactions within the battery component, which in the event of a fault can occur quickly and unpredictably, can cause a fluid pressure, which is increased in relation to the normal operating pressure or the ambient pressure of the battery (i.e. a relative overpressure), to develop within the battery component. To protect a housing of the battery component or of the battery system from overpressure-induced damage (caused by the increased fluid pressure in relation to the normal operating pressure or the ambient pressure), an interior chamber enclosed by the housing of the battery component may be automatically depressurized by the safety valve.

In addition to reliable overpressure relief, however, the safety valve is also expected to effectively and reliably prevent an ingress of environmental influences, such as the ingress of foreign particles or water, from the surrounding battery area into the battery component during normal operation of the battery component equipped therewith, of the battery system or of a vehicle equipped therewith. Normal operation can result in comparatively strong oscillations or vibrations. It is therefore necessary for the safety valve to apply a comparatively high closing force so as to ensure maximum possible sealing against the ingress of environmental influences during normal operation. This can be achieved by way of a spring element, for example.

At the same time, however, reliable overpressure relief should be ensured. It is desirable that the safety valve opens swiftly and at a comparatively low overpressure. It can be advantageous for this purpose when only a comparatively low opening force is needed.

Initially, however, the comparatively high closing force required above must be overcome for relieving the overpressure, or for opening the safety valve, which necessitates a comparatively high opening force. In general, it may be necessary for the opening force to be higher than the closing force. As a result, there is a need to resolve these conflicting objectives.

SUMMARY

Embodiments of the present disclosure create a safety valve in which overpressure relief may be improved at the highest possible closing force.

Embodiments of the present disclosure provide a fluidic safety valve, such as a pressure control valve, comprising a valve housing including at least one fluid inlet opening and at least one fluid outlet opening. A closing element is movably guided in the valve housing, the closing element being preloaded by a spring element at a predetermined preloading force or closing force toward a closed position of the safety valve. In the closed position of the safety valve, a fluid flow from the at least one fluid inlet opening toward the at least one fluid outlet opening is blocked. The closing element can be moved toward an open position of the safety valve which is directed counter to the closed position when a predetermined fluid pressure force is reached and/or exceeded, which results from a predetermined fluid pressure within an enclosed fluid chamber. In the open position of the safety valve, a fluid flow from the at least one fluid inlet opening toward the at least one fluid outlet opening is enabled, whereby overpressure relief is possible.

According to embodiments of the present disclosure, the valve housing is sealed by a valve housing sealing element comprising an effective fluid pressure force surface, which is coupled to the closing element to be moved between the closed position and the open position of the safety valve and can be moved relative to the valve housing, for carrying along the closing element.

According to embodiments of the present disclosure, the closing element is preloaded into the closed position of the safety valve by a closing force brought about by way of the spring element. For overpressure relief, which takes place by enabling a fluid flow from the at least one fluid inlet opening toward the at least one fluid outlet opening, it is possible to apply an opening force that results from the fluid pressure within a sealed fluid chamber to the fluid pressure force surface of the valve housing sealing element. As the closing force acting opposite the opening force is being overcome and thereafter, the valve housing sealing element moves relative to the valve housing and, during the movement thereof, carries along the closing element coupled to the effective fluid pressure force surface. In this way, the closing element can be moved from the closed position into the open position by the valve housing sealing element as a function of a predetermined fluid pressure force that results from a predetermined fluid pressure.

According to embodiments of the present disclosure, the opening force resulting from the fluid pressure force may therefore act exclusively on the valve housing sealing element, and on the effective fluid pressure force surface thereof.

According to embodiments of the present disclosure, in this configuration the safety valve may offer a comparatively high closing force (in absolute terms) to be implemented, despite a comparatively low opening force (in absolute terms). Moreover, the magnitude of the opening force of the safety valve can be preset or predetermined by varying a surface size of the effective fluid pressure force surface. This setting of the magnitude of the opening force can take place independently of the magnitude of the closing force or without any noteworthy influence on the magnitude of the closing force. In this way, reliable overpressure relief and reliable protection from the ingress of environmental influences are ensured at the same time.

According to embodiments of the present disclosure, the effective fluid pressure force surface, which moves relative to the valve housing, substantially carries out a lifting motion. The effective fluid pressure force surface may be located closer to the valve housing with a minimal lift, and further away from the valve housing with a maximal lift. The closing element coupled to the effective fluid pressure force surface can be disposed in the vicinity of the closed position with a minimal lift, and in the vicinity of the open position of the safety valve with a maximal lift. This lift-like movement places comparatively low requirements with regard to the installation space occupied by the safety valve. Moreover, a lift-like movement involves comparatively low requirements with regard to the mechanical load-bearing capacity of the valve housing sealing element. In this way, the design of the valve housing sealing element can be improved.

According to embodiments of the present disclosure, the valve housing sealing element may be at least partially designed to be elastic, which may improve the product life cycle. However, the design does not have to be spring elastic. In some embodiments, the valve housing sealing element is flexible, so that it is able to move away from the valve housing, and back to the same again, as frequently as possible without damage.

According to embodiments of the present disclosure, the valve housing sealing element may have a boot-like design at least in some sections. For the design configuration, the valve housing sealing element may have a bellows-like design at least in some sections. For this purpose, the valve housing sealing element can be designed in the form of a bellows that is folded elastically in an accordion-like manner. This may involve a section of a tube. This tube can be made of a chemically resistant rubber material, plastic material or the like.

According to embodiments of the present disclosure, the valve housing sealing element may comprise a boot section to attach to the valve housing. For example, a bonded joint may be provided between the valve housing (for example an end face of the valve housing) and the valve housing sealing element. The valve housing sealing element may be provided around the perimeter of an end face of the valve housing. The valve housing sealing element may be designed to seal the valve housing in a substantially fluid-tight manner, at least on an end face.

Embodiments of the present disclosure provide for the valve housing sealing element to be disposed on an end face of the valve housing which faces away from a fluid pressure chamber to be protected against the fluid pressure. The at least one fluid inlet opening may be provided on an end face facing the fluid pressure chamber to be protected against the fluid pressure, and the valve housing sealing element may be disposed on the end face located opposite thereof. The valve housing sealing element may be disposed at least partially outside the fluid pressure chamber to be protected against the fluid pressure, while the at least one fluid inlet opening may be disposed within the fluid pressure chamber to be protected against the fluid pressure.

Embodiments of the present disclosure provide a (sub) assembly of the safety valve, the effective fluid pressure force surface may be coupled to the closing element by way of at least one connecting element. By way of example, a screw element or the like can be provided as the connecting element. For this purpose, the effective fluid pressure force surface can include a through-passage, a recessed bushing or the like, through which the connecting element extends. A corresponding receptacle for the connecting element can be provided on the closing element, such as a receiving bushing or the like.

According to embodiments of the present disclosure, for a low opening force (in absolute terms), the closing element can be designed to be substantially force-neutral with respect to the fluid pressure force. For example, a surface that is exposed to the fluid pressure may be configured or disposed within the valve housing in such a way that an equilibrium of forces develops on the surface exposed to the fluid pressure with respect to the fluid pressure force resulting from the fluid pressure. As a result of the equilibrium of forces, the closing element behaves in a substantially force-neutral manner with respect to the fluid pressure force. This can be achieved, for example, by the fluid flowing around the closing element both in the direction of the closed position and in the direction of the open position.

According to embodiments of the present disclosure, the closing element is disposed relative to the at least one fluid inlet opening in such a way that the fluid pressure force acts on the closing element both in the direction of the closed position and in the direction of the open position.

According to embodiments of the present disclosure, the safety valve can be small when the closing element has a substantially piston crown-shaped design. With respect to an equilibrium of forces that can develop at the closing element, it is negligible that the piston crown shape of the closing element results in a smaller surface (in absolute terms) and a larger surface (in absolute terms) since the difference is negligibly small. In this embodiment, a receptacle for a connecting element to the valve housing sealing element can be disposed on the side of the closing element which faces away from the piston crown.

According to embodiments of the present disclosure, the spring element may be a compression spring. The compression spring pushes against the spring chamber above the top surface. The spring element may be a tension spring. If a tension spring is used, a mounting for the spring may be created between the top and bottom surfaces. The spring may be a spiral spring. The spring constant of the spring element is either known or can be determined by way of experimentation. In this way, the preloading force that can be generated on the closing element may be predetermined.

According to embodiments of the present disclosure, the safety valve can have a compact design when the at least one fluid outlet opening extends through the valve housing in the radial direction. Accordingly, a fluid that flows for overpressure relief from the at least one fluid inlet opening toward the at least one fluid outlet opening is discharged in the radial direction of the valve housing. For blocking or closing and optionally releasing the fluid outlet opening, the closing element can be disposed within the valve housing in such a way that it covers, and thereby closes, or releases the fluid outlet opening by the fluid pressure-induced change in position thereof.

According to embodiments of the present disclosure, the valve housing comprises a plurality of fluid inlet openings. These can be disposed, for example, on an end face of the safety valve which faces the fluid pressure chamber to be protected, and optionally can be distributed there.

According to embodiments of the present disclosure, the valve housing comprises a plurality of fluid outlet openings to provide high fluid throughput. Each of these openings can extend in the radial direction of the valve housing through the same, for example.

According to embodiments of the present disclosure, the safety valve can also be used as a pressure control valve or spill valve. The safety valve according to the present disclosure can be used wherever a fluid pressure chamber is to be protected against fluidic overpressure. It can be used in technical applications in which a comparatively low overpressure is to be sufficient for opening the safety valve, yet at the same time a high closing force is to act. By way of example, technical applications include process engineering, safety technology or the like.

According to embodiments of the present disclosure, the field of application is a battery component, in particular a vehicle battery component, comprising a safety valve in one or more of the above-described embodiments. The safety valve can also be used in plant engineering applications.

BRIEF DESCRIPTION OF FIGURES

Further details and related advantages of embodiments of the present disclosure will be described hereafter with reference to the figures.

The figures are only schematic representations and are provided only to explain the present disclosure. Like elements are uniformly denoted by like reference numerals.

DETAILED DESCRIPTION

Figure 1:
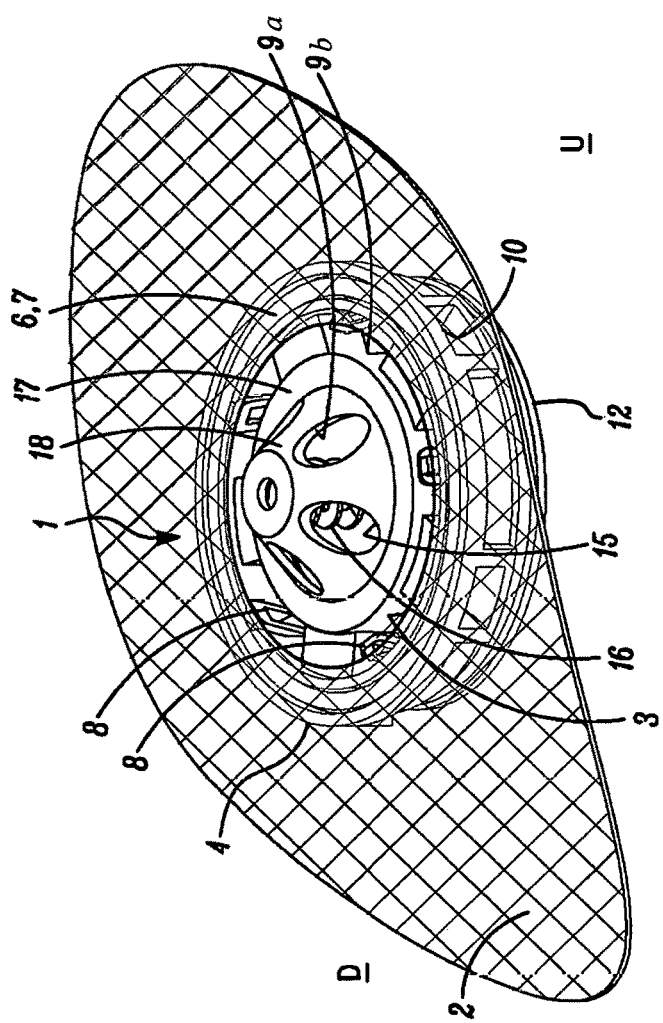
FIG. 1 shows a perspective top view onto an exemplary safety valve, which is disposed on a wall element having an interior chamber side and an exterior chamber side.

FIG. 1 shows a perspective top view onto a safety valve 1 according to the present disclosure. The safety valve 1 is intended to protect a substantially sealed fluid pressure chamber D, in which a varying fluidic pressure $p_i$ is present, against an impermissibly high rise in fluid pressure (i.e. against a predetermined fluidic overpressure) by timely opening. At the same time, in the closed position, the safety valve 1 protects the fluid pressure chamber D from the ingress of environmental influences from outside the fluid pressure chamber D.

The safety valve 1 can be used in a battery system (not shown) or in a battery component of a vehicle (not shown). Accordingly, the fluid pressure chamber D can be the interior of a battery system or of a battery component.

FIG. 1 shows that the safety valve 1 is disposed on or in a wall element 2, which separates the fluid pressure chamber D from a surrounding area U of the same, in which a fluidic ambient pressure $p_U$ is present, in a manner that is at least substantially fluid-tight with respect to the fluid pressure chamber D. The wall element 2 can be a battery housing, for example. So as to dispose the safety valve 1 in the wall element 2, the wall element 2 includes a through-passage 3 through which the safety valve 1 extends when installed. In this way, the safety valve 1 is flange-mounted on the wall element 2.

Figure 2:
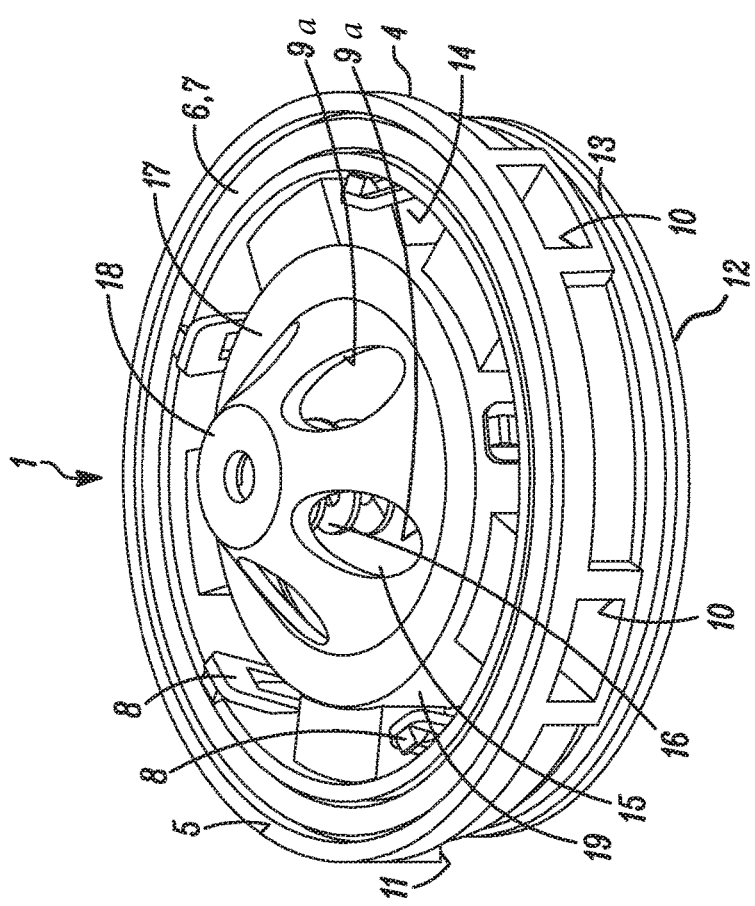
FIG. 2 shows an exemplary safety valve as an individual part in a perspective top view.

FIG. 2 shows the safety valve 1 as an individual component without the wall element 2 in a perspective top view. In FIG. 2, the safety valve 1 comprises a valve housing 4 having a substantially cylindrical basic shape. The valve housing 4 can be injection-molded from a plastic material, for example, wherein the plastic material is suited for use in batteries. On a first end face 5, the valve housing 4 comprises a sealing groove 6, in which a sealing ring 7 is disposed so as to be seated against the wall element 2, sealing the through-passage 3. The sealing ring 7 can be made of a suitable rubber material, for example. For attaching the safety valve 1 to the wall element 2, the valve housing 4 comprises a plurality of molded-on retaining clips 8, which can be brought into engagement with the wall element 2.

In the vicinity of the first end face 5, the valve housing 4 has a plurality of fluid inlet openings 9a, 9b in the form of apertures or cutouts. The fluid inlet openings 9a, 9b extend substantially in the axial direction of the valve housing 4 through the same. On the circumference, the valve housing 4 additionally includes a plurality of fluid outlet openings 10 in the form of fluid channels. The fluid outlet openings 10 extend in the radial direction of the valve housing 4 through the same.

On a second end face 11 located opposite the first end face 5, a valve housing sealing element 12 is attached to the valve housing 4. The valve housing sealing element 12 is designed to be at least partially flexible and substantially (i.e. to the greatest extent possible) seals the valve housing 4 in a fluid-tight manner. A flow path is therefore defined for a fluid to be discharged from the fluid pressure chamber D, the path extending through the fluid inlet openings 9a, 9b, into the valve housing 4, and beyond the fluid outlet openings 10 into the surrounding area U. FIG. 2 shows that the valve housing sealing element 12 is designed in a boot-like, in particular a bellows-like, manner at least in some sections. This is achieved by a boot section 13, adjoined by the effective fluid pressure force surface 14 (discernible only partially here, see FIG. 4). For low forces of inertia, the boot section 13 can be made of a comparatively lightweight, flexible material. For example, this can be a rubber material. The effective fluid pressure force surface 14 can be made either of the same material or of a rigid material. The more detailed configuration of the valve housing sealing element 12 is described below.

Within the valve housing 4, a closing element 15 is disposed, which is guided therein for a translatory back and forth movement and preloaded by a spring element 16, which is described in greater detail below.

Figure 3:
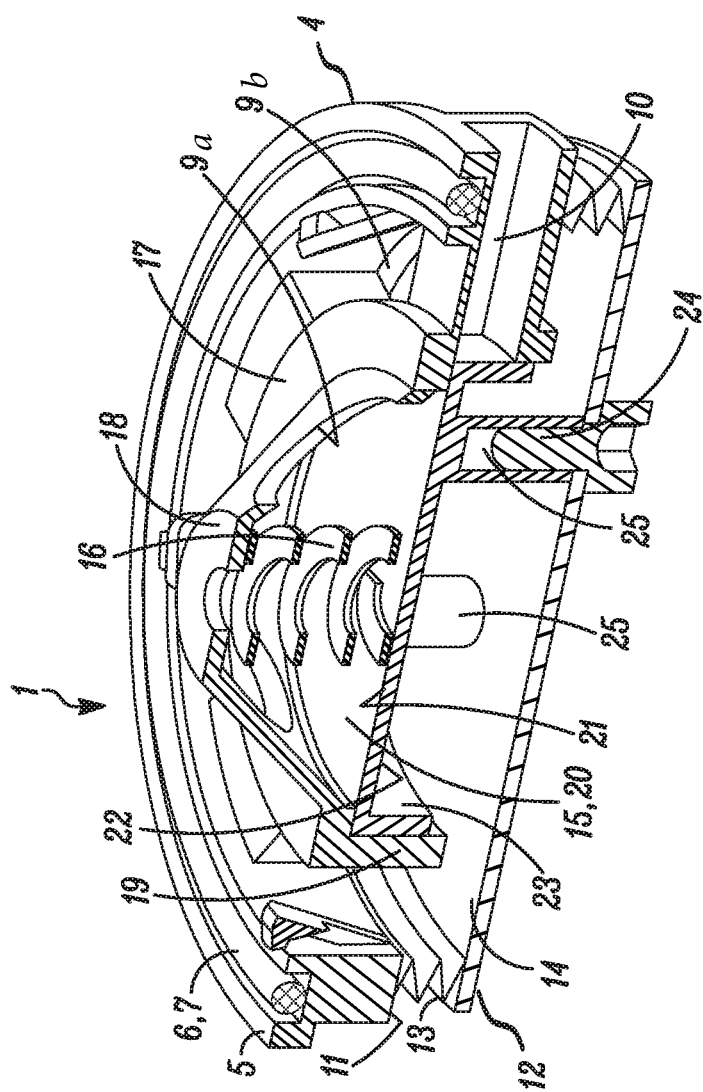
FIG. 3 shows a sectional illustration of an exemplary safety valve in a perspective view.

FIG. 3 shows a sectional illustration of the safety valve 1 in a perspective view. The valve housing 4 includes a central section 17. The central section 17 includes a conical spring chamber 18, which receives the spring element 16. In this exemplary embodiment, the spring chamber 18 protrudes over the first end face 5 of the safety valve. In addition, the central section 17 includes a cylinder section 19, which adjoins the spring chamber 18 and is used to receive and guide the closing element 15. In the cylinder section 19, the fluid outlet openings 10 extend in the radial direction from the inside to the outside. The spring chamber can also take on another shape that allows the spring to be mounted.

As shown in FIG. 3, the closing element 15 has a substantially piston crown-shaped design, which is achieved by providing a piston crown 20 with a top surface 21 and a bottom surface 22 and a piston skirt 23 adjoining the piston crown 20. The piston skirt 23 is shaped and dimensioned such that it can be guided by the cylinder section 19 of the valve housing 4. As shown in FIG. 3, the piston skirt 23 is dimensioned such that it can selectively close the fluid outlet openings 9a, 9b by overlapping with the same, or release them by way of a relative displacement. In this way, the closing element 15 can be moved between a closed position, in which a fluid flow from the fluid inlet openings 9a, 9b toward the fluid outlet openings 10 is blocked, and an open position directed counter to the closed position, in which a fluid flow from the fluid inlet openings 9a, 9b toward the at least one fluid outlet opening 10 is enabled. The closing element 15 is preloaded by the spring element 16 toward the closed position of the safety valve 1, wherein the spring element 16 may be a spiral spring configured as a tension spring.

The boot section 13 of the valve housing sealing element 12 is connected to a circular ring surface (not denoted) of the second end face 11, by a bonded joint, for example. By expanding, the boot section 13 makes a lifting motion of the effective fluid pressure force surface 14 relative to the valve housing 4 possible, in particular to the second end face 11. The effective fluid pressure force surface 14 may have a substantially circular design.

As shown in FIG. 3, the closing element 15 and the effective fluid pressure force surface 14 of the valve housing sealing element 12 are coupled to each other, or connected to each other, by way of a plurality of connecting elements 24. In this exemplary embodiment, the connecting elements 24 are screws, which are made of a metal or a plastic material. Serving as a counter-element for the connecting elements 24, the closing element 15 comprises respective receptacles 25, which cooperate with the connecting elements 24 and thereby form a screw joint in this exemplary embodiment. At the same time, the receptacles 25 also act as a kind of spacer, by way of which the valve housing sealing element 12 (which is at least partially designed to be elastic) is disposed at a distance from the valve housing 4, in particular from the second end face 11. If multiple connecting elements 24 are present, uniform guidance is ensured. However, a single connecting element would also be sufficient, if necessary.

As shown in FIG. 3, the closing element 15 may be shaped and disposed within the valve housing 4 in such a way that, when a fluid flows in through the fluid inlet openings 9a, 9b, said fluid flows around the closing element both on the side facing the first end face 5 and on the side facing the second end face 11 of the valve housing 4. Because the bottom surface 22 in FIG. 3 and the top surface 21 in FIG. 3 of the closing element 15 are approximately the same size, an equilibrium of forces develops at the closing element 15. As a result, one single effective surface is created for a force resulting from a fluid pressure, namely the effective fluid pressure force surface 14 of the valve housing sealing element 12.

Figure 4:
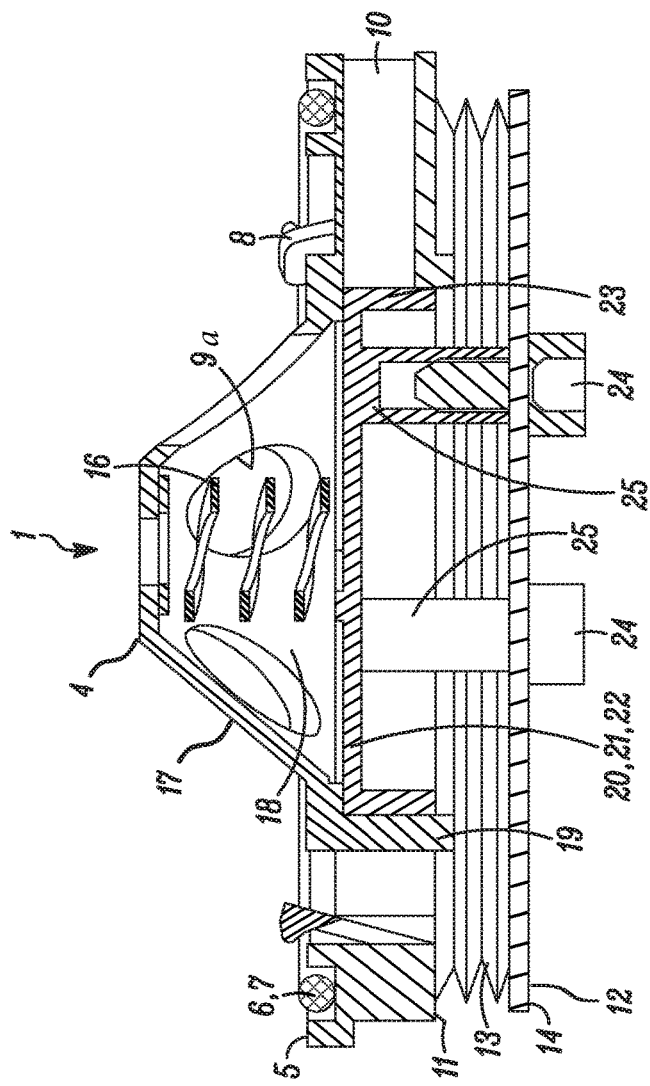
FIG. 4 shows a sectional side view of an exemplary safety valve.

FIG. 4 shows a sectional side view of the safety valve 1. The effective fluid pressure force surface 14 and an end of the piston skirt 23 of the closing element 15 which faces away from the piston crown 20 at the bottom side of the closing element 15 are spaced apart from each other by the receptacles 25 such that fluid can flow around the closing element 15 both from beneath and from above. The closing element 15 may be shaped and disposed such that it carries out a lifting motion relative to the valve housing 4.

Figure 5:
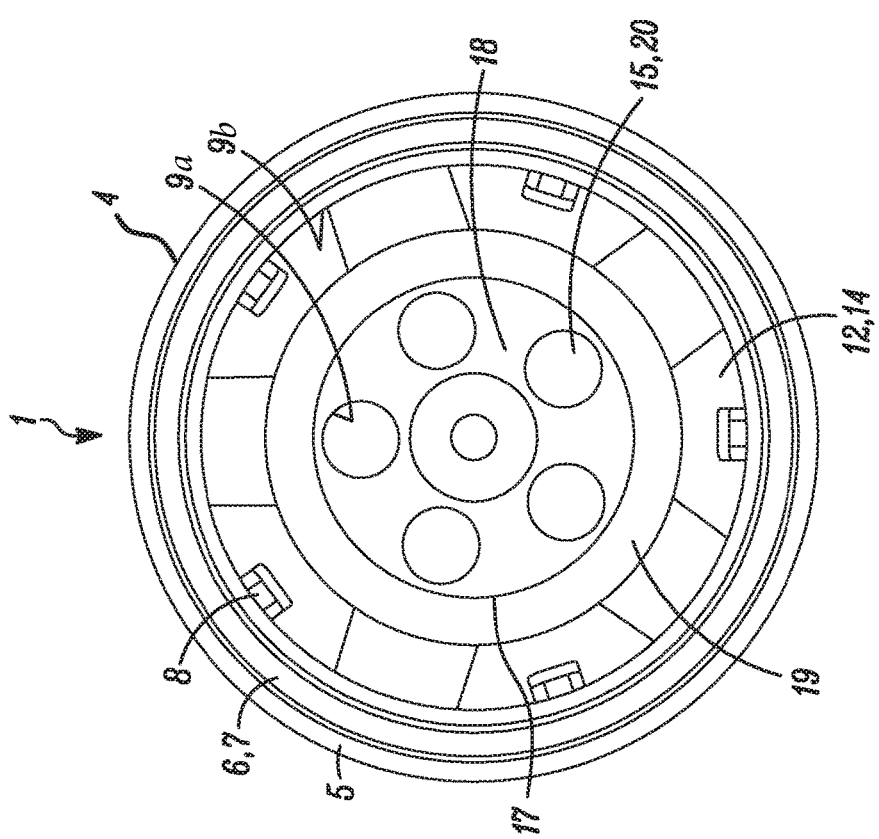
FIG. 5 shows a top view onto an exemplary safety valve.

FIG. 5 shows a top view onto the safety valve 1 according to the present disclosure. The effective fluid pressure force surface 14 of the valve housing sealing element 12 has a comparatively large dimension in relation to the top surface 21 of the piston crown 20 of the closing element 15. Moreover, the arrangement of the fluid inlet openings 9a, 9b and of the retaining clips 8 is discernible here, which is provided only by way of example.

Based on FIG. 3, which shows a sectional illustration of the safety valve 1 in a perspective view, an exemplary operation of the safety valve 1 shall be described hereafter.

The starting situation is a normal operation of a battery component (not shown), serving as the fluid pressure chamber D in which a fluidic pressure $p_i$ is present. During normal operation, said pressure $p_i$ corresponds at least approximately to the fluidic pressure of the surrounding area U of the fluid pressure chamber D in which a fluidic ambient pressure $p_U$ is present. Therefore, approximately the following applies: $p_i = p_U$.

During said normal operation, the closing element 15 is preloaded or compressed by the predetermined preloading force of the spring element 16 into the closed position of the safety valve 1, whereby a fluid flow from the fluid inlet openings 9a, 9b toward the fluid outlet openings 10 is blocked by the closing element 15, and in particular by the piston skirt 23 thereof.

In the event of overpressure (for example, caused by a battery cell becoming damaged), the pressure $p_i$ is higher than the ambient pressure $p_U$. When the pressure $p_i$ of the fluid pressure chamber D exceeds a value that is predetermined by the spring constant of the spring element 16 and/or the dimensioning of the effective fluid pressure force surface 14 of the valve housing sealing element 12, a fluid pressure force $F_{pi}$ resulting from the fluid pressure $p_i$ acts on the effective fluid pressure force surface 14 of the valve housing sealing element 12. The fluid pressure force $F_{pi}$ is approximately determined as: $F_{pi} = p_i \cdot A_{14}$.

When the fluid pressure force $F_{pi}$ reaches and/or exceeds the preloading force of the spring element 16 in this case, the effective fluid pressure force surface 14 is moved out of the closed position away from the valve housing 4 by the expansion of the boot section 13 of the valve housing sealing element 12. The effective fluid pressure force surface 14 in FIG. 3 moves downward away from the valve housing 4. As a result of the coupling to the effective fluid pressure force surface 14 by way of the connecting elements 24, the closing element 15, around which otherwise fluid flows in a force-neutral manner, consequently also moves, together with the effective fluid pressure force surface 14, out of the closed position into the open position of the safety valve 1. After the closing element 15 leaves the closed position, but at the latest after it reaches the open position, the fluid can flow from the fluid inlet openings 9a, 9b toward the fluid outlet openings 10 until the fluid pressure $p_i$ has dropped enough that the preloading force of the spring element 16 is greater than the fluid pressure force $F_{pi}$ resulting from the fluid pressure $p_i$.

The embodiments described above are merely exemplary, and the safety valve 1 according to the present disclosure may be modified in a variety of ways.

In some embodiments, the boot section 13 is not attached to the valve housing 4 by way of a bonded joint, but by way of a form-locked connection. It is also possible to provide fewer or more than the shown connecting elements 24 and/or receptacles 25 for coupling the effective fluid pressure force surface 14 to the closing element 15.

While the present disclosure is illustrated and described in detail according to the above embodiments, the present disclosure is not limited to these embodiments and additional embodiments may be implemented. Further, other embodiments and various modifications will be apparent to those skilled in the art from consideration of the specification and practice of one or more embodiments disclosed herein, without departing from the scope of the present disclosure.

What is claimed is:

1. A fluidic safety valve, comprising:
   a valve housing, and a valve housing sealing element configured to seal the valve housing in a fluid-tight manner, the valve housing including:
   at least one fluid inlet opening;
   at least one radial fluid outlet opening; and
   a closing element disposed in a central section of the valve housing preloaded by a spring element at a predetermined preloading force toward a closed position of the safety valve, wherein
   the closing element includes a piston crown and a piston skirt, the piston skirt extending away from the piston crown, and
   the closing element is configured to
      be movably guided between the closed position of the safety valve and an open position of the safety valve when a predetermined fluid pressure has been reached;
      block a fluid flow in the closed position by the piston skirt; and
      in the open position, enable the fluid flow from the at least one fluid inlet opening toward the at least one fluid outlet opening,
   wherein the valve housing sealing element includes:
      an effective fluid pressure force surface coupled to the closing element and configured to move relative to the valve housing; and
      a boot section coupling the effective fluid pressure force surface to a circular ring surface of an end face of the valve housing,
      wherein expansion of the boot section is configured to enable a lifting motion of the effective fluid pressure force surface relative to the valve housing, causing the closing element to be carried within the central section.

2. The safety valve according to claim 1, wherein movement of the effective fluid pressure force surface relative to the valve housing creates the lifting motion.

3. The safety valve according to claim 1, wherein the valve housing sealing element is at least partially elastic.

4. The safety valve according to claim 1, wherein the valve housing sealing element is disposed on an end face of the valve housing which faces away from a fluid pressure chamber.

5. The safety valve according to claim 1, wherein the effective fluid pressure force surface is coupled to the closing element by a connecting element.

6. The safety valve according to claim 1, wherein the closing element is configured to be force-neutral with respect to a fluid pressure force.

7. The safety valve according to claim 1, wherein the closing element is disposed relative to the at least one fluid inlet opening such that a fluid pressure force acts on the closing element both in the direction of the closed position and in the direction of the open position.

8. The safety valve according to claim 1, wherein the spring element is a tension spring.

9. The safety valve according to claim 1, wherein the at least one fluid inlet opening is one of a plurality of fluid inlet openings.

10. The safety valve according to claim 1, wherein the at least one fluid outlet opening is one of a plurality of fluid outlet openings.

11. A fluidic safety valve of a vehicle battery component, comprising:
    a valve housing and a valve housing sealing element configured to seal the valve housing in a fluid-tight manner, the valve housing including:
    at least one fluid inlet opening;
    at least one radial fluid outlet opening; and
    a closing element disposed in a central section of the valve housing preloaded by a spring element at a predetermined preloading force toward a closed position of the safety valve, wherein
    the closing element includes a piston crown and a piston skirt, the piston skirt extending away from the piston crown, and
    the closing element is configured to
       be movably guided between the closed position of the safety valve and an open position of the safety valve when a predetermined fluid pressure has been reached;
       block a fluid flow in the closed position by the piston skirt; and
       in the open position, enable the fluid flow from the at least one fluid inlet opening toward the at least one fluid outlet opening,
    wherein the valve housing sealing element includes:
       an effective fluid pressure force surface coupled to the closing element and configured to move relative to the valve housing; and
       a boot section coupling the effective fluid pressure force surface to a circular ring surface of an end face of the valve housing,
       wherein expansion of the boot section is configured to enable a lifting motion of the effective fluid pressure force surface relative to the valve housing, causing the closing element to be carried within the central section.

12. The safety valve according to claim 11, wherein movement of the effective fluid pressure force surface relative to the valve housing creates the lifting motion.

13. The safety valve according to claim 11, wherein the valve housing sealing element is at least partially elastic.

14. The safety valve according to claim 11, wherein the valve housing sealing element is disposed on an end face of the valve housing which faces away from a fluid pressure chamber.

15. The safety valve according to claim 11, wherein the effective fluid pressure force surface is coupled to the closing element by a connecting element.

16. The safety valve according to claim 11, wherein the closing element is configured to be force-neutral with respect to a fluid pressure force.

17. The safety valve according to claim 11, wherein the closing element is disposed relative to the at least one fluid inlet opening such that a fluid pressure force acts on the closing element both in the direction of the closed position and in the direction of the open position.

18. A fluidic safety valve, comprising:
a valve housing including:
at least one fluid inlet opening;
at least one radial fluid outlet opening; and
a closing element disposed in a central section of the valve housing preloaded by a spring element at a predetermined preloading force toward a closed position of the safety valve, wherein
the closing element includes a piston crown and a piston skirt, the piston skirt extending away from the piston crown,
the closing element is movably guided between the closed position of the safety valve and an open position of the safety valve when a predetermined fluid pressure has been reached;
the closing element blocks a fluid flow in the closed position by the piston skirt, and
in the open position, the closing element enables the fluid flow from the at least one fluid inlet opening toward the at least one fluid outlet opening; and
a valve housing sealing element that includes:
an effective fluid pressure force surface coupled to the closing element, wherein the effective fluid pressure force surface moves relative to the valve housing; and
a boot section coupling the effective fluid pressure force surface to a circular ring surface of an end face of the valve housing, wherein
expansion of the boot section lifts the effective fluid pressure force surface relative to the valve housing and carries the closing element within the central section,
wherein the valve housing is configured to be sealed in a fluid-tight manner.

* * * * *